March 19, 1946.  R. C. WHITMAN  2,396,905
CHEESE BANDAGE
Filed Oct. 28, 1943
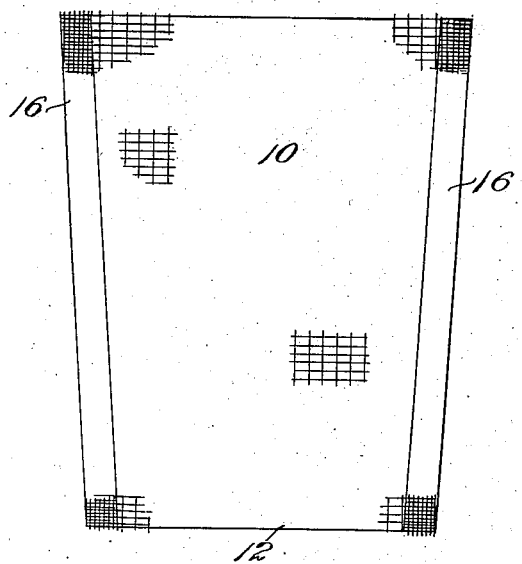
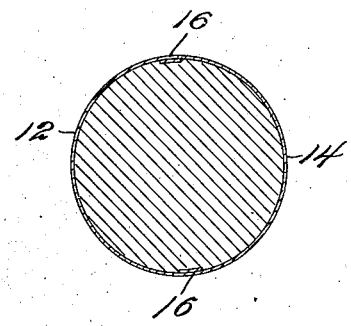
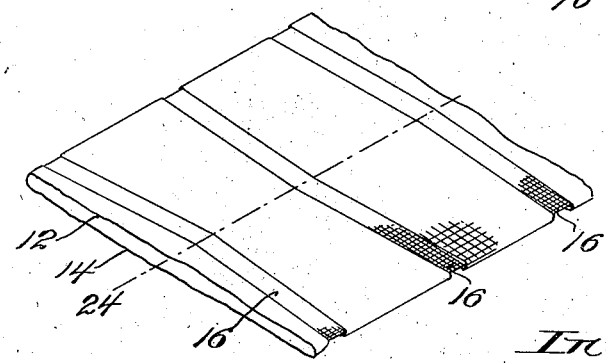
Inventor
Rose C. Whitman Patented Mar. 19, 1946.

2,396,905

UNITED STATES PATENT OFFICE 2,396,905

CHEESE BANDAGE

Ross C. Whitman, Walpole, Mass., assignor to The Kendall Company, Boston, Mass., a corporation of Massachusetts Application October 28, 1943, Serial No. 507,962

2 Claims. (Cl. 139—389)

The present invention relates to improvements in cheese bandages.

The cheese bandage to which reference is made in the accompanying specification, is employed principally in the manufacture of Cheddar or pressed cheese to support the cheese in shape during the ageing process and to assist in the formation of the rind. Cheese bandages are made from loosely woven fabrics and are tubular in form to correspond with the exterior shape of the cheese. The bandage is first placed in position within a so-called "hoop" in a reverse position, that is, with the flaps inside. The curd prepared in the customary manner is then poured into the container, and the mass is subjected to considerable pressure which serves to force out any remaining water and whey and to set the cheese body. At the end of a period which may approximate twelve hours, the cheese supported within the bandage is removed from the hoop and put aside to age. Subsequently the cheese is inspected, coated with paraffin and then set aside to be further aged or cured. This ageing process may continue for six or eight months. Physical changes which take place during this period include a tendency of the cheese mass to swell laterally and the gradual development of a protecting rind or covering for the cheese.

The cheese bandage plays a vital part in the process above described, in that it confines the cheese, holds it in shape, and prevents it from swelling to such a point that it cracks the rind which is developing, permitting entry of bacteria which leads to undesired decay or the formation of mold in the cheese mass.

It has been proposed to manufacture bandages for supporting cheese during the ageing process, from seamless tubular fabric of relatively loose weave. A bandage made in this way has the advantage that the threads extending transversely around the cheese are in the form of an unbroken series of coils to provide a maximum of strength against lateral swelling or expansion of the cheese mass. The manufacture and use of seamless cheese bandages of this type is, however, seriously restricted by practical considerations which include relatively high manufacturing costs, the difficulty of adjustment of the looms to meet a wide range of sizes of cheese bandages required by the trade, and the further difficulty of weaving such tubular bandages in a tapered form to fit cheeses which are tapered, that is, which have when opened out, roughly the shape of a frusto-conical section.

A very large proportion of the cheese bandages currently used in the industry are made from strip material which is cut to shape and the edges seamed together to form the finished article. The seam thus formed running lengthwise of the bandage cuts directly across the relatively heavy transverse bursting stresses set up in the bandage by the swelling of the cheese during the ageing process, and as might well be expected, is the weakest part of the bandage and the place at which failure is most likely to occur. It has in fact been found that where mold or decay has set in during the ageing process, such imperfections are almost invariably to be found along the seam line of the bandage. In many cases cracks have occurred in the rind as a result of the failure of the bandage along the seam line permitting the entry of moisture and air into the body of the cheese. In other cases when no such failure is discernible, decay has set in due, it is believed, to the tendency of bacteria to collect around any irregular or indented exterior surface of the cheese rind such as may be produced by the bunching or ribbing of the material incidental to the seaming operation.

Inasmuch as failure of the cheese bandage along the seam and the formation of mold in the cheese mass frequently cannot be detected until after the cheese has aged a number of months, and as each individual cheese represents a substantial initial investment, the loss of even an occasional cheese package from this cause must be regarded as a serious matter, and many attempts have been made to provide an inexpensive and practicable cheese bandage which will not be subject to the imperfections above described.

It is a principal object of the invention to provide a novel and improved cheese bandage of the general type having at least one union of two fabric edges extending longitudinally of the bandage to give the bandage its tubular form, which will have substantially greater strength along the line of union of the fabric edges than seamed bandages of the prior art to resist bursting stresses set up during the cheese ageing process, and which will have a substantial continuity of texture and smoothness circumferentially of the bandage to avoid the deleterious effects of the ribbing or bunching of the fabric along the more conventional seam line.

It is a further object of the present invention to provide a novel and improved cheese bandage which is particularly adapted to be produced economically and efficiently on power looms in blanks of such size as to employ the full capacity of the loom.

Specifically, in accordance with this object of the invention, a novel and improved cheese bandage is provided which is particularly adapted to be woven as part of a substantially larger blank on a power loom, and which when separated therefrom and opened out will be tubular in form and of any desired size and shape. The cheese bandage herein disclosed as embodying in a preferred form the several features of the invention is tapered or frusto-conical in shape.

With these and other objects in view, and in accordance with a principal feature of the invention, it is proposed to manufacture the improved cheese bandage herein disclosed from multi-ply woven fabric, and with at least one union of the fabric edges provided by an interweave of the two plies of the fabric to produce the desired tubular form and shape. The interweave as a means for joining the fabric edges, has been found to represent a substantial improvement over the seams of the prior art for use in the manufacture of tubular cheese bandages, in that the interweave provides a substantially stronger union of the edges of the loose mesh material employed than has been achieved by an ordinary seaming operation, together with a high degree of uniformity and smoothness of texture of the fabric circumferentially when viewed from the reverse or exterior side of the bandage as it is applied on the cheese package. In order to provide a union of the desired strength, an interweave is provided of sufficient width and with a sufficient number of lengthwise yarns therein to prevent the possible pulling out or displacement of the transversely extending yarns. The interwoven area comprised of all of the warp and filling yarns of both fabric plies provides a firm, closely woven fabric for bonding together the fabric plies at their edges.

Another feature of the invention consists in the provision of a fabric blank of such size as to permit the use of a power loom as nearly as possible to its full capacity, and so constructed and arranged that the individual cheese bandages may be severed therefrom in finished condition ready for use. In the illustrated form of the invention, the blank consists of an indeterminate length of a two-ply fabric produced by tubular weaving with interwoven strips inserted therein of such shape and location as to provide tapered bag-like sections which when severed from the blank by cutting along the interweaves and transversely thereof and opened out, will have the shape of a truncated cone section.

In accordance with another feature of the invention, the interwoven strips are arranged to extend across the blank transversely of the warp at spaced intervals to form the bag-like sections in the blank from which the individual bandages are subsequently formed by the severing operation. With this form of blank, the cheese bandages are arranged therein with their tubular axes extending transversely of the warp, so that the warp threads of the blank run circumferentially of the individual cheese bandages, and the filling threads extend longitudinally of the tubular axis. This construction and arrangement of the blank is of considerable advantage, in that it permits of a most efficient disposition of the lengthwise and circumferentially extending threads in the individual bandages while at the same time permitting substantial economies to be effected in the weaving of the blank. The warp yarns which are relatively heavier and stronger than the filling yarns in most fabrics, are most advantageously disposed as the circumferentially extending yarns of the bandage to support the cheese mass against circumferential bursting strains set up within the ageing cheese mass, whereas the relatively weaker filling yarns are most advantageously disposed as the longitudinally extending yarns of the bandage which are called upon to bear little or no strain. This disposition of the warp and filling yarns is of advantage also in that it lends itself most economically to the manufacture of cheese bandages having the desirable characteristic of a high count of the circumferentially extending threads to withstand the bursting strains referred to which is readily effected by increasing the number of warp ends, and a relatively low count of the threads extending longitudinally of the tubular axis of the bandage which is readily effected by reducing the number of filling picks to the inch. In the event that a stronger union between the fabric edges is desired than will be provided by the interweaving of all the warp and filling yarns of both fabric plies, the count of filling picks per inch which in this embodiment of the invention comprise the longitudinally extending yarns of the bandage may be still further increased in the interwoven area to provide a firm locking engagement with the circumferentially extending warp yarns to be bonded together in the interwoven area.

In the preferred form of the invention illustrated, the interwoven strips extend across the blank transversely of the warp in accordance with a recurring pattern in which the adjacent interwoven strips alternately converge and diverge with relation to one another to produce tapered bandages. In order to utilize the full width of the loom on which the blank is being produced, it is contemplated that two or more bandages will be placed end-to-end transversely of the blank, and with their large ends and small ends alternately abutting to produce a series of identical bandages.

While in the illustrated form of the invention the direction or shape of the interwoven strips in the blank is controlled through the manipulation of harnesses in accordance with the desired pattern of weave, it will be understood that this invention is not limited to any particular method of producing these interwoven strips. It will be understood also that other arrangements or patterns of interwoven strips in the blank may be employed as may be found desirable in the production of a blank from which the individual cheese bandages may be separated. For a description of one form of fabric blank from which cheese bandages may be severed, and of a method adapted for weaving the same, reference may be had to an application for Letters Patent of Laurence A. Savage, filed in the United States Patent Office April 28, 1944, Serial No. 533,156, for improvements in Manufacture of textiles.

The several features of the invention together with the advantages to be obtained thereby will be readily understood by one skilled in the art from the following description taken in connection with the accompanying drawing, in which Fig. 1 is a view of applicant's improved cheese bandage in its flattened form as it will appear immediately after it has been severed from the blank; Fig. 2 is a somewhat diagrammatic view of a portion of a fabric blank woven on a loom of standard type and from which applicant's improved cheese bandages will be severed; and Fig. 3 is a diagrammatic sectional view of the cheese package.

The cheese bandage which embodies in a preferred form the several features of the invention, is shown in Fig. 1 of the drawing in a flattened-out form, and in Fig. 3 in its reversed and opened-out form in connection with a cheese package having the conventional shape of a truncated cone section. The cheese bandage designated at 10 is composed of two fabric plies 12, 14 connected at their edges by interwoven strips 16 which are set at a slight angle to one another so that the cheese bandage when reversed and opened out as shown in Fig. 3, will assume the desired frusto-conical shape. In the preferred form of the bandage, the interwoven strips 16 are made of substantial width which may approximate one-half of an inch to an inch, so that a substantial number of longitudinally extending yarns are included in the interweave. These longitudinally extending yarns in the interwoven area are intimately engaged with and grip the circumferential yarns to provide a fastening means of surprising strength and durability.

The interweave herein described comprises a particularly efficient means of fastening together two abutting edges of the loose mesh woven material commonly employed in the manufacture of cheese bandages. The union of fabric edges formed by the interweave is of uniform strength and texture, and has been found to be capable of withstanding tensioning strains equal to or even considerably in excess of the tensile breaking strength of other portions of the fabric. The seaming or stitching operation normally employed for this purpose, produces a substantially weaker seam, as well as an objectionable ribbing effect. In this connection it may be noted that the stitched seam consists usually of a single line of stitches, each of which may gather in one or several of the transversely extending yarns. Further, the line of stitching provides only a single locking thread engagement with the transversely extending yarns as compared with the relatively large number of closely woven, longitudinally extending yarns of the interweave. Within the interwoven area connecting the two fabric plies, each individual circumferentially extending yarn is engaged and gripped by a relatively large number of longitudinally extending yarns to lock the circumferentially extending yarns against slippage or pulling out.

Tests have indicated that a cheese bandage of the general type described, made of loosely woven material, and having, for example, a tensile breaking strength of about 28 lbs. per inch circumferentially of the bandage, will also have a breaking strength of about 28 lbs. per inch at the line of union of the fabric edges provided by the interweave. In prior art samples tested by applicant, made from material of comparable strength but in which the edges were held together by a seaming operation, the circumferential threads of the fabric were found to tear away at the seam under stresses substantially less than the breaking strength of the remainder of the fabric, averaging about 17 lbs. per inch for the common seamed bandages, and about 11 lbs. per inch for bandages having seams made in accordance with the teachings of U. S. Patent No. 1,937,986 to Schwartz.

In addition to the advantage of the substantially increased strength of the cheese bandage provided by the use of an interweave for joining together the fabric edges, a further advantage is obtained in that a substantially uniform texture of the fabric is maintained circumferentially of the cheese bandage without any appreciable crease or break at the line of juncture. As previously pointed out, the cheese bandage is applied in a reverse position so that the interwoven strips 16 are located toward the inside of the package. These strips being relatively narrow when compared with standard commercial bandages and of thin material, have no tendency to bunch up and to form ridges such as those which are usually formed by the more usual type of seaming operation, and which are believed to be one of the principal causes of the formation of mold in the cheese package.

In the preferred form of the invention illustrated in the drawing, the cheese bandage is composed of a loosely woven unbleached cotton material having a count of 20 threads to the inch longitudinally of the package, and a count of 40 threads to the inch in a transverse direction circumferentially of the package. The individual threads or yarns may run between 20s and 50s in size. Substantial variation may appear in the weave, as any loose mesh material of this general type having the requisite strength circumferentially of the bandage may be employed. It is preferred, however, to employ fabric having a count which may run between 15 and 35 in the lengthwise direction, and between 30 and 50 in the transverse direction circumferentially of the bandage.

For use in a cheese bandage of this general description, a relatively high count of yarns circumferentially of the bandage is of advantage in order to provide a strong supporting cover for the cheese mass against the transverse bursting stresses set up therein during the ageing process. A fabric having a low count longitudinally of the bandage in which direction the strains are less, is desirable in order to provide a cheese bandage of porous weave to permit the squeezing out of the whey, a more rapid drying of the cheese, and also for greater economy of manufacture. In the interwoven areas, the thread count in each direction is doubled, for the reason that all of the yarns forming the transverse and longitudinal elements of both the upper and lower ply of the fabric are combined in the interweave. This tightening of the weave in the interwoven sections of the fabric has a useful function to provide a strong union of the fabric edges.

A feature of the present invention consists of the fabric blank from which the individual cheese bandages are severed. The bandage and the blank from which it is taken are closely related to one another, in that the bandage is particularly adapted to be woven as part of a blank which is of such size and is of such construction as to enable the bandages to be produced economically and efficiently on power looms of standard type, and with full utilization of loom capacity. Essentially the blank comprises a multi-ply fabric having interwoven areas therein so constructed and arranged that the individual cheese bandages may be readily severed from the blank in their completed form.

It will be understood that a blank of this general description may be readily produced in accordance with the present invention on any loom of standard type having the necessary pattern and control mechanisms for the production of multiply fabric and for interweaving portions of the two fabric plies in accordance with a desired pattern, and that the invention in its broader aspects is not limited to any particular form of blank or pattern of interweaves. In Fig. 2 of the drawing, is illustrated a preferred form of blank in which a two ply fabric is produced by means of tubular weaving, and interwoven areas are provided therein in the form of transverse strips which are arranged at alternately converging and diverging angles with relation to one another to provide bag-like sections of the blank which when severed therefrom will form tapered cheese bandages of the desired shape and size.

A feature of the invention consists in the construction and arrangement of the blank so that the individual cheese bandages to be severed therefrom are formed in the blank with their rotational axis extending transversely, that is, weftwise of the blank. The warp yarns of the fabric are then the transverse or circumferentially extending yarns of the individual cheese package, and the filling yarns are the longitudinally extending threads of the bandage. A fabric having a high count of warp yarns and a low count of filling yarns may thus be employed for the manufacture of a cheese bandage having a high count of yarns extending transversely or circumferentially of the bandage, and a low count of yarns extending longitudinally of the bandage. Substantial economies in operation are effected by the weaving of a fabric having a low count of filling yarns since the rate of production of the loom is roughly in inverse proportion to the number of filling picks per inch of the fabric which the loom is called upon to produce.

In order to produce a fabric blank which will engage as nearly as possible the full capacity of the loom, the pattern of the interwoven strips is determined so that two or more cheese bandages will be woven end-to-end transversely of the blank. In the illustration of Fig. 2, it is assumed by way of example that the individual bandages are 16 inches in length, and that the particular loom has a capacity of at least 32 inches. As shown in Fig. 2, the interwoven strips are assumed to be two inches in width and to follow zig-zag paths across the blank at alternately converging and diverging angles with relation to one another, so that each individual bag-like section of the blank at its widest portion will have a width of about eleven inches, and at its narrowest portion will have a width of about nine inches.

In order to separate out the individual cheese bandages such as that shown in Fig. 1, from the blank shown in Fig. 2, the fabric is split lengthwise down the middle as indicated by the dot-and-dash line 24 in Fig. 2, and along each edge, thus opening out both ends of the cheese bandage, and is then cut transversely along the middle of each successive interweave to complete the separation of the bandages from the blank.

It will be understood that the invention is not limited to the specific embodiment shown, and that various deviations may be made therefrom without departing from the spirit and scope of the appended claims.

What is claimed is:

1. For use in the manufacture of cheese, a mold inhibiting two-ply woven textile cheese bandage consisting of a section woven from cotton yarn in the order of 20s to 50s in weight, said section being composed of two fabric plies of loose mesh weave having a count in the order of 15 to 35 per inch in the lengthwise direction, and a count in the order of 30 to 50 per inch in the transverse direction circumferentially of the bandage, said section having at least one union of the fabric edges extending lengthwise of the bandage to give the bandage when filled the tubular shape, said union being provided by an interweave of said fabric plies of a width in the order of one-quarter to one-half inch and having a count of the longitudinally extending yarns in the order of twice the count of the longitudinally extending yarns of each individual ply.

2. As a new article of manufacture, a tubular cheese bandage formed from a fabric blank comprising a two-ply fabric having interwoven strip areas extending transversely thereof spaced from one another to form individual tubular cheese bandages, in which the longitudinally extending yarns of the bandage are the filling yarns of the blank, and the circumferentially extending yarns of the bandage are the warp yarns of the blank when the bandage is severed from the blank by cutting along said interwoven strips.

ROSS C. WHITMAN.